US010690051B2

(12) United States Patent
Andersson et al.

(10) Patent No.: US 10,690,051 B2
(45) Date of Patent: Jun. 23, 2020

(54) TWO-STROKE OPPOSED PISTON INTERNAL COMBUSTION ENGINE

(71) Applicant: VOLVO TRUCK CORPORATION, Göteborg (SE)

(72) Inventors: Lennart Andersson, Varberg (SE); Arne Andersson, Mölnlycke (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 729 days.

(21) Appl. No.: 15/315,767

(22) PCT Filed: Jun. 16, 2014

(86) PCT No.: PCT/EP2014/001624
§ 371 (c)(1),
(2) Date: Dec. 2, 2016

(87) PCT Pub. No.: WO2015/192859
PCT Pub. Date: Dec. 23, 2015

(65) Prior Publication Data
US 2017/0122199 A1    May 4, 2017

(51) Int. Cl.
*F02B 25/00* (2006.01)
*F02B 75/28* (2006.01)
(Continued)

(52) U.S. Cl.
CPC .............. *F02B 75/282* (2013.01); *F01B 7/14* (2013.01); *F02B 25/08* (2013.01); *F02B 75/02* (2013.01);
(Continued)

(58) Field of Classification Search
CPC ........ F02B 75/282; F02B 25/08; F02B 75/02; F02B 75/28; F02B 2075/025;
(Continued)

(56) References Cited

U.S. PATENT DOCUMENTS 2,408,448 A * 10/1946 Rossman ................ F02B 25/00
                                                       123/73 V
2,506,512 A *  5/1950 Mallory .................... F01B 7/14
                                                       123/51 BA
(Continued)

FOREIGN PATENT DOCUMENTS

CH      284 888 A      8/1952
DE      44 45 779 A1   6/1996
(Continued)

OTHER PUBLICATIONS

International Search Report (dated Jul. 7, 2015) for corresponding International App. PCT/EP2014/001624.
(Continued)

*Primary Examiner* — Hung Q Nguyen
*Assistant Examiner* — Anthony Donald Taylor, Jr.
(74) *Attorney, Agent, or Firm* — Venable LLP; Jeffri A. Kaminski

(57) ABSTRACT

A two-stroke opposed piston internal combustion engine including a plurality of cylinders, each cylinder being provided with a first piston and a second piston adapted to perform opposed motions in the cylinder, each cylinder being provided with at least one intake port, a communication between an air intake arrangement and the cylinder via the intake port being dependent on the position of the first piston, each cylinder further being provided with at least one exhaust port, a communication between an exhaust guiding arrangement and the cylinder via the exhaust port being dependent on the position of the second piston, at least one of the cylinders being provided with an additional port and an additional port valve, a communication between the cylinder and an additional conduit externally of the cylinder, via the additional port, being controllable with the additional port valve, the air intake arrangement including at least one
(Continued)

intake valve for selectively reducing or inhibiting air admittance to at least one of the cylinders.

20 Claims, 10 Drawing Sheets

(51) Int. Cl.
| | |
|---|---|
| F02D 41/00 | (2006.01) |
| F01B 7/14 | (2006.01) |
| F02D 13/02 | (2006.01) |
| F02D 41/02 | (2006.01) |
| F02B 25/08 | (2006.01) |
| F02B 75/02 | (2006.01) |

(52) U.S. Cl.
CPC .......... *F02B 75/28* (2013.01); *F02D 13/0276* (2013.01); *F02D 41/0002* (2013.01); *F02D 41/0087* (2013.01); *F02D 41/0245* (2013.01); F01N 2430/02 (2013.01); F02B 2075/025 (2013.01); F02B 2275/14 (2013.01); F02D 2041/0012 (2013.01); F02D 2250/34 (2013.01); F02D 2400/04 (2013.01); Y02T 10/18 (2013.01); Y02T 10/26 (2013.01); Y02T 10/42 (2013.01)

(58) Field of Classification Search
CPC .... F02B 2275/14; F01B 7/14; F02D 13/0276; F02D 41/0002; F02D 41/0087; F02D 41/0245; F02D 2041/0012; F02D 2250/34; F02D 2400/04; F01N 2430/02; Y02T 10/18; Y02T 10/26; Y02T 10/42
USPC .......................................................... 123/65
See application file for complete search history.

(56) References Cited

U.S. PATENT DOCUMENTS

| | | | | |
|---|---|---|---|---|
| 3,485,221 | A * | 12/1969 | Feeback | F01B 7/14 |
| | | | | 123/51 AA |
| 3,550,568 | A * | 12/1970 | Peterson | F02B 75/224 |
| | | | | 123/51 BD |
| 4,090,479 | A * | 5/1978 | Kaye | F02B 25/08 |
| | | | | 123/306 |
| 4,237,831 | A * | 12/1980 | Noguchi | F01B 11/00 |
| | | | | 123/51 BA |
| 4,257,365 | A * | 3/1981 | Noguchi | F02B 25/08 |
| | | | | 123/51 B |
| 4,357,916 | A * | 11/1982 | Noguchi | F01B 7/14 |
| | | | | 123/51 BA |
| 5,397,922 | A * | 3/1995 | Paul | B60L 50/62 |
| | | | | 290/1 A |
| 9,032,927 | B1 * | 5/2015 | Redon | F02B 75/12 |
| | | | | 123/179.16 |
| 9,194,288 | B2 * | 11/2015 | Cleeves | F02B 1/02 |
| 2003/0121249 | A1 | 7/2003 | Foster et al. | |
| 2008/0047530 | A1 * | 2/2008 | Cleeves | F01L 5/06 |
| | | | | 123/51 AA |
| 2008/0115771 | A1 * | 5/2008 | Elsbett | F01L 5/06 |
| | | | | 123/51 BA |
| 2008/0196701 | A1 * | 8/2008 | Ohlmann | F01L 9/026 |
| | | | | 123/65 BA |
| 2009/0159022 | A1 * | 6/2009 | Chu | F02B 29/0406 |
| | | | | 123/52.2 |
| 2010/0147269 | A1 * | 6/2010 | Flowers | F01L 5/06 |
| | | | | 123/51 R |
| 2012/0080007 | A1 * | 4/2012 | Herold | F02B 23/0645 |
| | | | | 123/299 |
| 2012/0089316 | A1 * | 4/2012 | Cleeves | F01L 5/06 |
| | | | | 701/102 |
| 2012/0125298 | A1 * | 5/2012 | Lemke | F01B 7/14 |
| | | | | 123/51 B |
| 2012/0204841 | A1 | 8/2012 | Hofbauer et al. | |
| 2012/0210985 | A1 * | 8/2012 | Fuqua | F01L 1/38 |
| | | | | 123/51 B |
| 2013/0220279 | A1 * | 8/2013 | Cleeves | F01B 7/14 |
| | | | | 123/48 R |
| 2014/0026563 | A1 * | 1/2014 | Dion | F02F 1/186 |
| | | | | 60/605.2 |
| 2014/0311431 | A1 * | 10/2014 | Cleeves | F01L 5/06 |
| | | | | 123/41.42 |

FOREIGN PATENT DOCUMENTS

| | | | | |
|---|---|---|---|---|
| GB | 2 008 191 | A | 5/1979 | |
| GB | 2 026 604 | A | 2/1980 | |
| GB | 2 045 346 | A | 10/1980 | |
| JP | S59 79024 | A | 5/1984 | |
| WO | 96/38658 | A1 | 12/1996 | |
| WO | 2011146111 | A1 | 11/2011 | |
| WO | WO2011146111 | * | 11/2011 | ............. F02B 25/08 |
| WO | 2013051968 | A1 | 4/2013 | |

OTHER PUBLICATIONS

International Preliminary Report on Patentability (dated Sep. 9, 2016) for corresponding International App. PCT/EP2014/001624.

* cited by examiner

TWO-STROKE OPPOSED PISTON INTERNAL COMBUSTION ENGINE

BACKGROUND AND SUMMARY

The invention relates to internal combustion piston engines, in particular two-stroke opposed piston engines. A two-stroke opposed piston internal combustion engine comprises at least one cylinder, each cylinder being provided with a first piston and a second piston adapted to perform opposed motions in the cylinder, each cylinder being provided with at least one intake port, a communication between an air intake arrangement and the cylinder via the intake port being dependent on the position of the first piston, each cylinder further being provided with at least one exhaust port, a communication between an exhaust guiding arrangement and the cylinder via the exhaust port being dependent on the position of the second piston.

The invention also relates to a method of controlling a two-stroke opposed piston internal combustion engine, a method for controlling an internal combustion piston engine comprising a plurality of cylinders, a computer program and a computer readable medium for performing the steps of the methods, and a controller and an engine block for a two-stroke opposed piston internal combustion engine.

Here initially, some known characteristics and examples of a two-stroke opposed piston internal combustion engine as mentioned above are provided. The first and second pistons would normally be connected to at least one crankshaft. For example, as is known, the engine could present two crankshafts, and the first and second pistons could be connected to a respective of the crankshafts. Alternatively, as is also known, there could be one crankshaft, and one of the first and second pistons could be connected to the crankshaft by a linkage mechanism.

Further, as is known, the air intake arrangement could be presented by the engine to provide air to the cylinder. The air intake arrangement can comprise a single intake manifold, or more than one intake manifold, e.g. where the cylinders are arranged in a V-configuration. As is also known, the exhaust guiding arrangement could be presented by the engine to conduct exhaust gases from the cylinder. Similarly, the exhaust guiding arrangement can comprise a single exhaust manifold, or more than one exhaust manifold, e.g. where the cylinders are arranged in a V-configuration. Also, of course a fuel system could be provided for controlling the supply of fuel to the cylinders.

Herein, where reference is made to the communication between the air intake arrangement and the cylinder, the intention is to refer to a communication between an air intake arrangement and the interior space in the cylinder. Similarly, where reference is made to the communication between the exhaust guiding arrangement and the cylinder, the intention is to refer to a communication between the exhaust guiding arrangement and the interior space in the cylinder.

In order to keep emissions from a vehicle internal combustion piston engine as low as possible, it is of interest to keep the exhaust after treatment system (EATS) of such an engine operating efficiently during all modes of operation of the engine.

2-stroke opposed piston (2SOP) engines have a number of advantages over engines with one piston per cylinder. As a 2-stroke engine it has a higher power density than a 4-stroke engine, but provides also, compared to 2-stroke engines with one piston per cylinder, a more thorough purging of the cylinders since the intake and exhaust ports are provided at opposite ends of the cylinder liner.

2SOP engines have been the subjects of a number of proposals for improvements, for example for engine braking as described in US2012210985 A1. However, a problem with 2SOP engines that needs additional attention is that the exhaust temperature and exhaust pressure can be very low, and as a result from this the performance of an EATS can be poor. WO2013051968 describes, in a single piston per cylinder engine, cylinder deactivation at low load for increasing the exhaust temperature. Nevertheless, there is a need for providing further improvements of the EATS performance, in particular for 2 SOP engines.

It is desirable to improve the performance of an exhaust after treatment system (EATS) in an internal combustion piston engine, in particular a two-stroke opposed piston engine.

According to an aspect of the present invention, a two-stroke opposed piston internal combustion engine is provided comprising a plurality of cylinders, each cylinder being provided with a first piston and a second piston adapted to perform opposed motions in the cylinder, each cylinder being provided with at least one intake port, a communication between an air intake arrangement and the cylinder via the intake port being dependent on the position of the first piston, each cylinder further being provided with at least one exhaust port, a communication between an exhaust guiding arrangement and the cylinder via the exhaust port being dependent on the position of the second piston, at least one of the cylinders being provided with an additional port and an additional port valve, a communication between the cylinder and an additional conduit externally of the cylinder, via the additional port, being controllable with the additional port valve, the air intake arrangement comprising at least one intake valve for selectively reducing or inhibiting air admittance to at least one of the cylinders with one intake valve per cylinder, or with a single intake valve being adapted to control air admittance to more than one cylinder but less than all cylinders, wherein less than all cylinders are provided with additional ports, and the at least one intake valve is provided for selectively reducing or inhibiting air admittance to the remaining cylinders.

Herein, where reference is made to the communication between the additional conduit and the cylinder, the intention is to refer to a communication between the additional conduit and the interior space in the cylinder.

The exhaust temperature of 2SOP engines is particularly low at low engine loads, and is caused by the scavenge process this type of engine. If the EATS is located downstream of a turbo charger, the latter may cool the exhaust gases before reaching the EATS, and the result can be a very poor performance of the EATS. The invention is particularly beneficial where the engine is a diesel engine. As is known, in a two stroke diesel cycle the load is controlled with a fuel injector in each cylinder, whereas the amount of air admitted into the cylinder at each cycle is roughly the same at different loads. With the additional port and the additional port valve, it is possible to keep, during the compression stroke, after the intake and exhaust ports have been blocked by the pistons, the additional port valve open so that air can escape through the additional port, and close the additional port valve before the top dead centres are reached by the pistons and fuel is injected. Thereby, the additional port provides the function of an air removal port. This is particularly useful in low load operation in a diesel engine, since it will result in less air being trapped in the cylinder, giving a higher exhaust temperature. This in turn will improve the performance of the EATS during low loads.

Since the air intake arrangement comprises at least one intake valve for selectively reducing or inhibiting air admittance to at least one of the cylinders, during low loads the air supply to some cylinders can be terminated, while the additional port valves are activated in the remaining cylinders, providing a particularly effective manner of maintaining a high exhaust temperature. Thereby it is possibly to further increase the exhaust gas temperature and to further improve the performance of the EATS during low loads.

The intake valve arrangement can be provided such that there is one intake valve per cylinder.

Alternatively, a single intake valve can be adapted to control communication to more than one cylinder but less than all cylinders, i.e. a sub-group of the cylinders.

Less than all cylinders are provided with additional ports, and the at least one intake valve can be provided for selectively 1 educing or inhibiting air admittance to the remaining cylinders.

Such an arrangement would reduce the complexity and cost of the engine, since the additional port and the additional port valve is provided in only some of the cylinders.

During high loads it might be desired to utilize the entire air capacity of the cylinder and therefore to keep the additional port valve closed during the entire cycle. To provide for changing the operating mode of the additional port valve, a variable valve timing technology would be beneficial. Thereby it should be noted that the additional pmi valve can be actuated in a number of different ways, e.g. in a "cam less" manner, such as with a pneumatic valve technology, e.g. as in EP1299622, an electro-mechanical actuator, a hydraulic actuator, or a stepper motor, or using a cam shaft with cam switching, cam phasing, or an oscillating cam.

However, in some embodiments described below, the additional port valve remains open during the entire strokes of the respective cylinders, and thereby a simpler valve actuation can be used, and it could be e.g. hydraulic.

Preferably, the additional port is located such that, in an open position of the additional port valve, it allows communication between the cylinder and the additional conduit via the additional port when communication between the cylinder and the air intake arrangement via the intake port is blocked by the first piston, and communication between the cylinder and the exhaust guiding arrangement via the exhaust port is blocked by the second piston. Thereby, it is ensured that it is possible to keep, during the compression stroke, after the intake and exhaust ports have been blocked by the pistons, the additional port valve open so that air can escape through the additional port to reduce the amount of air trapped in the cylinder, to give a higher exhaust temperature.

Preferably, the intake port and the exhaust port are spaced apart in the longitudinal direction of the cylinder, and the additional port is located between the intake port and the exhaust port. This will also ensure that it is possible to keep the additional port valve open after the intake and exhaust ports have been blocked.

Preferably, the additional conduit is a part of, or is arranged to communicate with, the air intake arrangement. Thereby, it is ensured that air guided from the cylinder through the additional port will be kept in the "intake side" of the cylinder, and not contribute to cooling the exhaust gases.

Preferably, the additional port valve is a poppet valve. Thereby the additional port valve can be implemented in a fashion similar to inlet and exhaust valves in four stroke engines, which is well-established and readily available in the engine industry. However, alternatively, the additional port valve can be provided in some other manner, for example as a sliding sleeve as in US20081 15771 A1.

Preferably, the additional port valve is arranged so that a part of the additional port valve extends, in an open position of the additional port valve, into the cylinder, and the first and second pistons present respective recesses to accommodate said part of the additional port valve. Such recesses will provide for allowing the pistons to come close to each other as desired in a 2SOP engine, while providing for an effective additional port valve implementation, such as a poppet valve, extending into the cylinder in its open condition.

Preferably, the additional port is located such that top dead positions of the first and second pistons are symmetrically distributed with respect to the additional port. Thereby, the additional port can be centred in the longitudinal direction of the cylinder, providing an effective cylinder air removal function.

Preferably, where the additional port valve is arranged so that a part of the additional port valve extends, in an open position of the additional port valve, into the cylinder, the top dead centres of the first and second pistons are symmetrically located with respect to said part of the additional port valve. Thereby, where the pistons are provided with recesses as mentioned above, these recesses can be symmetric, which allows for the first and second pistons to be identical, which makes manufacturing easier and cheaper. Said part of the additional port valve can be symmetric with respect to a symmetry plane, the normal of the symmetry plane being parallel to the longitudinal direction of the cylinder, and the top dead centres can be symmetrically located with respect to said symmetry plane.

According to another aspect of the invention, a two-stroke opposed piston internal combustion engine is provided comprising at least one cylinder, each cylinder being provided with a first piston and a second piston adapted to perform opposed motions in the cylinder, each cylinder being provided with at least one intake port, a communication between an air intake arrangement and the cylinder via the intake port being dependent on the position of the first piston, each cylinder further being provided with at least one exhaust port, a communication between an exhaust guiding arrangement and the cylinder via the exhaust port being dependent on the position of the second piston, at least one of the at least one cylinder being provided with an additional port and an additional port valve, a communication between the cylinder and an additional conduit externally of the cylinder, via the additional port, being controllable with the additional port valve, the additional port being offset from a symmetry plane, the normal of the symmetry plane being parallel to the longitudinal direction of the cylinder, and the top dead centres of the first and second pistons being symmetrically located with respect to the symmetry plane.

As understood, the additional port is offset from the symmetry plane in the longitudinal direction of the cylinder. Thereby the communication between the cylinder and the additional conduit externally of the cylinder via the additional port can be, in dependence of the offset direction, dependent on the position of the first piston or dependent on the position of the second piston. Thus, for activation of the exhaust temperature increasing operation, described above, in this aspect, the additional port valve can be opened and remain open throughout the cycles in the cylinder. Thereby a valve actuator for the additional valve can be provided in a simple and cost effective form. Where the additional conduit is connected to the air intake arrangement, the permanently open additional valve port might result in some exhaust gases entering the air intake arrangement; this might advantageously be used as an exhaust gas recirculation function.

It should be noted that this aspect can of course be combined with the aspect described above where the air intake arrangement comprises at least one intake valve for selectively reducing or inhibiting air admittance to at least one of the cylinders.

Preferably, a distance is provided between the additional port and the symmetry plane. Where the intake port and the exhaust port are located on opposite sides of the symmetry plane, the additional port can be located on the same side of the symmetry plane as the intake port. Thereby, the additional port can extend, in the longitudinal direction of the cylinder, closer to the symmetry plane than the intake port. Alternatively, the additional port can be located on the same side of the symmetry plane as the exhaust port, and the additional port can extend, in the longitudinal direction of the cylinder, closer to the symmetry plane than the exhaust port.

According to another aspect of the invention, a two-stroke opposed piston internal combustion engine is provided comprising at least one cylinder, each cylinder being provided with a first piston and a second piston adapted to perform opposed motions in the cylinder, each cylinder being provided with at least one intake port, a communication between an air intake arrangement and the cylinder via the intake port being dependent on the position of the first piston, each cylinder further being provided with at least one exhaust port, a communication between an exhaust guiding arrangement and the cylinder via the exhaust port being dependent on the position of the second piston, characterised in that at least one of the at least one cylinder is provided with an additional port and an additional port valve, a communication between the cylinder and the air intake arrangement via the additional port, being controllable exclusively with the additional port valve.

As has been mentioned above, the additional port makes it possible the increase the exhaust temperature in a diesel engine. Since the communication between the cylinder and the air intake arrangement via the additional port is controllable exclusively with the additional port valve, it is ensured that air guided from the cylinder through the additional port will be kept in the "intake side" of the cylinder, and not contribute to cooling the exhaust gases. The communication between the cylinder and the air intake arrangement may be provided via an additional conduit externally of the cylinder. The additional conduit can be a part of, or be arranged to permanently communicate with, the air intake arrangement.

The additional port valve may be a poppet valve. The additional port valve may be arranged so that a part of the additional port valve extends, in an open position of the additional port valve, into the cylinder, and the first and second pistons present respective recesses to accommodate said part of the additional port valve.

According to another aspect of the invention, a method of controlling a two-stroke opposed piston internal combustion engine comprising at least one cylinder is provided, each cylinder being provided with a first piston and a second piston adapted to perform opposed motions in the cylinder, each cylinder being provided with at least one intake port, and at least one exhaust port, at least one of the at least one cylinder being provided with an additional port and an additional port valve, a communication between the cylinder and an additional conduit externally of the cylinder, via the additional port, being controlled with the additional port valve, the method comprising opening, in at least one of the at least one cylinder which is provided with an additional port and an additional port valve, the additional port between consecutive first and second top dead centre positions of the first piston, and subsequently, during a movement of the first piston towards the second top dead centre position, before the first piston has reached the second top dead centre position, closing the additional port after a transition from a condition with a communication between the air intake arrangement and the cylinder via the intake port, to a condition where the communication between the air intake arrangement and the cylinder via the intake port is blocked by the first piston.

Thereby, the additional port valve can be opened during introduction of air through the intake port, and closed after the intake port has been blocked by the first piston. This will allow some of the air introduced through the intake port to be expelled through the additional port during the compression stroke. Thereby the exhaust temperature can be kept high during low load engine operation.

To accomplish the steps of the method, the additional port may be opened and closed by opening and closing, respectively the additional port valve. Alternatively, for example where, as described above, additional port is offset from the symmetry plane between the piston top dead centres, the additional port may be opened and closed dependent on the position of the first or second piston.

Preferably, the step of opening the additional port is performed during a movement of the first piston away from the first top dead centre position, and after a transition from a condition where a communication between the air intake arrangement and the cylinder via the intake port is blocked by the first piston, to a condition with a communication between the air intake arrangement and the cylinder via the intake port. Thereby the additional port valve is not opened until the intake port is exposed to the interior cylinder space. Thus, the additional port valve is not opened during the expansion phase, and it is ensured that no exhaust gases are guided through the additional port.

Where the engine comprises a plurality of cylinders, and a fuel system for controlling the supply of fuel to the cylinders, the method can further comprise reducing or inhibiting the supply of air and fuel to a subgroup of the cylinders so as to inhibit combustion in the subgroup of the cylinders, the subgroup comprising at least one cylinder and less than all cylinders. Inhibiting combustion in the subgroup of the cylinders is advantageously performed simultaneously as the steps of opening and closing the additional port valves. In principle, the additional port valves in all cylinders can be opened and closed, as described above, while combustion in the subgroup of the cylinders is inhibited. However, alternatively, the additional port valves in the subgroup of cylinders in which the combustion is inhibited, can be kept closed, while the additional port valves in the remaining cylinders are opened and closed, as described above. Thereby, as also mentioned above, during low loads the air supply to some cylinders can be terminated, while the additional port valves are activated in the remaining cylinders, providing a particularly effective manner of maintaining a high exhaust temperature.

An aspect of the invention provides a method for controlling an internal combustion piston engine comprising a plurality of cylinders, a fuel system for controlling the supply of fuel to the cylinders, an air intake arrangement for controlling the supply of air to the cylinders, and an exhaust guiding arrangement to conduct exhaust gases from the cylinders, the method comprising determining a value of an exhaust pressure related parameter, being the pressure of the exhaust gases in the exhaust guiding arrangement, or a correlated engine operation parameter, values of which are correlated to respective values of the pressure of the exhaust gases in the exhaust guiding arrangement, comparing the determined value of the exhaust pressure related parameter to a predetermined threshold value of the exhaust pressure related parameter, —reducing or inhibiting, in dependence of the comparison between the determined value and the threshold value of the exhaust pressure related parameter, the supply of air and fuel to a subgroup of the cylinders, the subgroup comprising at least one cylinder and less than all cylinders, so as to inhibit combustion in the cylinder or cylinders in the subgroup.

Inhibiting combustion in the cylinder(s) in the subgroup will deactivate the cylinder(s). This will provide an effective manner of reducing, during low load operation, the introduction of air through the engine. This is particularly beneficial in a 2SOP engine, especially where such an engine is provided as a diesel engine. During low load operation, deactivating and inhibiting air supply to the subgroup of cylinders will provide a higher pressure in the exhaust guiding arrangement which is beneficial to maintaining catalytic reactions in an exhaust after treatment system (EATS).

Preferably, where the engine comprises a turbo charger to pressurise air in the intake arrangement using energy of the exhaust gases in the exhaust guiding arrangement, the exhaust pressure related parameter is the pressure of the exhaust gases upstream of the turbo charger, or a correlated engine operation parameter, the values of which are correlated to the pressure of the exhaust gases upstream of the turbo charger. This embodiment is particularly beneficial where at least a part of the EATS is located upstream of the turbo charger, i.e. where a pan of, or the entire EATS is located upstream of turbo charger. As is known per se, the energy used by the turbo charger is provided by the pressure of the exhaust gases in the exhaust guiding arrangement upstream of the turbo charger. During low engine loads, this pressure falls. Where the turbo charger is a variable geometry turbo (VGT), a falling pressure in the exhaust guiding arrangement can to some extent be met with an adjustment of the turbo charger, as is known in the art. However, if the pressure falls below a certain level, the turbo charger will stop operating, reducing the pressure further, which can be disadvantageous for the operation of the EATS. By reducing or inhibiting at low loads, in dependence of pressure upstream of the turbo charger, the supply of air and fuel to the subgroup of the cylinders, it is possible to control and keep the exhaust pressure high enough for the turbo charger to keep operating. An operative turbo charger will further contribute to keeping the pressure in the air intake arrangement as well as the exhaust guiding arrangement relatively high, which again is beneficial to the processes in the EATS. The embodiment is particularly advantageous where the turbo charger is a variable geometry turbo (VGT) or a variable nozzle turbo (VNT).

The step of determining a value of the exhaust pressure related parameter can include detection of the exhaust pressure with a pressure sensor in the exhaust guiding arrangement. The pressure sensor is preferably located upstream of the turbo charger.

In some embodiments, the exhaust pressure related parameter is the pressure of the exhaust gases upstream of the EATS, or a correlated engine operation parameter, the values of which are correlated to the pressure of the exhaust gases upstream of the EATS. Where the exhaust pressure related parameter is the pressure, a pressure sensor located upstream of the EATS can be used. However, it is also possible for the exhaust pressure related parameter to be the pressure of the exhaust gases downstream of at least a part of the EATS and upstream of the turbo charger, or a correlated engine operation parameter, the values of which are correlated to the pressure of the exhaust gases downstream of at least a part of the EATS and upstream of the turbo charger.

Where a correlated engine operation parameter is used, such a parameter could be for example the engine load, values of which are correlated to respective values of the exhaust gas pressure upstream of the EATS. In some embodiments, the method can comprise providing correlation data which correlates the values of the correlated engine operation parameter to the respective values of the exhaust pressure, and storing the correlation data in a data storage, wherein the step of determining a value of the exhaust pressure related parameter comprises determining a value of the correlated engine operation parameter.

Preferably, the correlation data is provided before operation of the engine. Preferably, the data storage in which the correlation data is stored is accessible to the controller.

Preferably, the engine comprises at least one intake valve for selectively blocking communication between at least one of the cylinders and the air intake arrangement, and the step of reducing or inhibiting the supply of air and fuel to a subgroup of the cylinders comprises selecting the subgroup of the cylinders, and controlling the intake valve so as to reduce or inhibit the supply of air to the subgroup of the cylinders. The intake valve(s) will thus provide the function of deactivating the cylinder(s) in the subgroup. Preferably, the engine is a two-stroke opposed piston internal combustion engine.

According to another aspect of the invention, a computer, a computer program, a computer readable medium are provided.

According to another aspect of the invention, a controller is provided for a two-stroke opposed piston internal combustion engine comprising at least one cylinder, each cylinder being provided with a first piston and a second piston adapted to perform opposed motions in the cylinder, each cylinder being provided with at least one intake port, and at least one exhaust port, at least one of the at least one cylinder being provided with an additional port and an additional port valve, a communication between the cylinder and an additional conduit externally of the cylinder, via the additional port, being controlled with the additional port valve, the controller being adapted to control a valve actuator so as for the additional port valve to assume a closed position and an open position, the open position allowing communication between the cylinder and the additional conduit via the additional port, the controller further being configured to perform the steps of a method according to an aspect of the invention.

Further, an engine block is provided for a two-stroke opposed piston internal combustion engine, presenting at least one cylinder, each cylinder being adapted to be provided with a first piston and a second piston adapted to perform opposed motions in the cylinder, each cylinder being provided with, in a region to be swept by the first piston, at least one intake port for admittance of air into the cylinder, each cylinder further being provided with, in a region to be swept by the second piston, at least one exhaust port for exit of gas from the cylinder, at least one of the at least one cylinder being provided with an additional port for providing a communication between the cylinder and an additional conduit externally of the cylinder, the additional conduit being presented by or connectable to the engine block, the additional port being offset from a symmetry plane, the normal of the symmetry plane being parallel to the longitudinal direction of the cylinder, and the top dead centres of the first and second pistons being symmetrically located with respect to the symmetry plane.

As is known per se, the admittance of air through the intake port into the cylinder will depend on the position of the first piston. Also, exit of gas from the cylinder through exhaust port will depend on the position of the second piston. It is also understood that the intake port and the exhaust port are spaced apart in the longitudinal direction of the cylinder.

The benefits with the additional port, providing a communication between the cylinder and the additional conduit externally of the cylinder, have been explained above.

DESCRIPTION OF FIGURES

Below embodiments of the invention will be described with reference to the drawings, in which.

DETAILED DESCRIPTION

Figure 1:
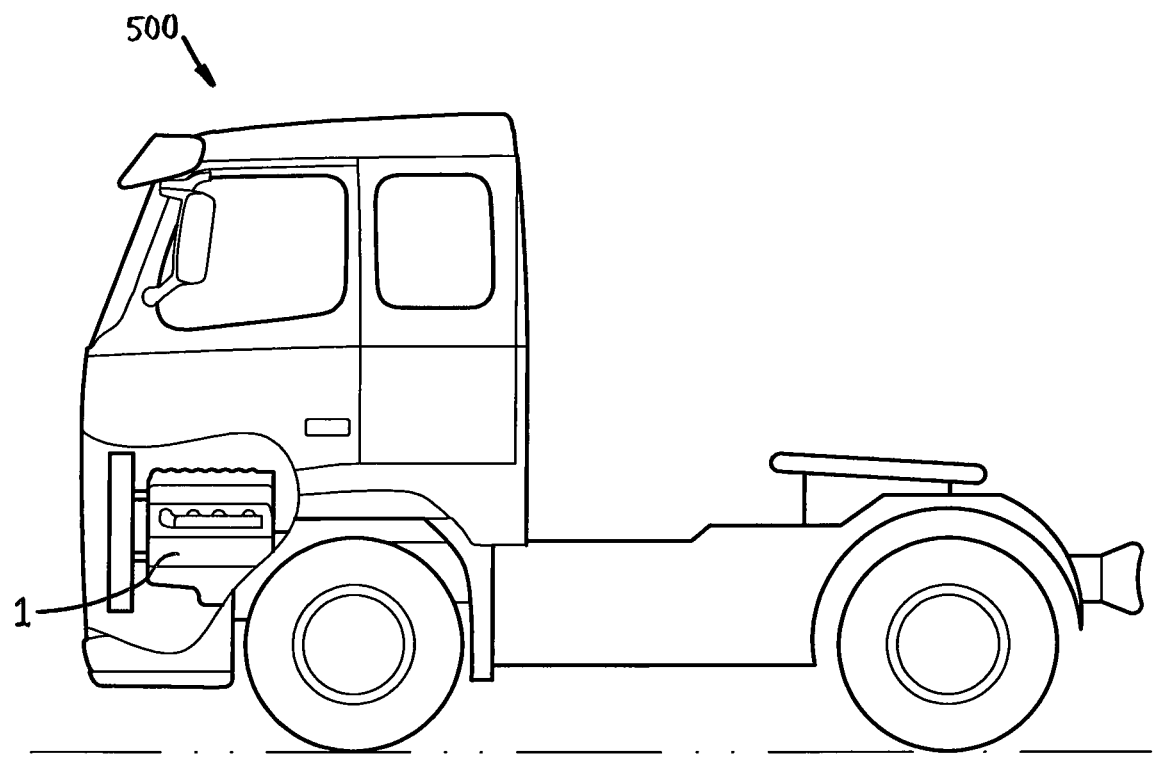
FIG. 1 shows a truck with an engine as depicted in FIG. 2.
Figure 2:
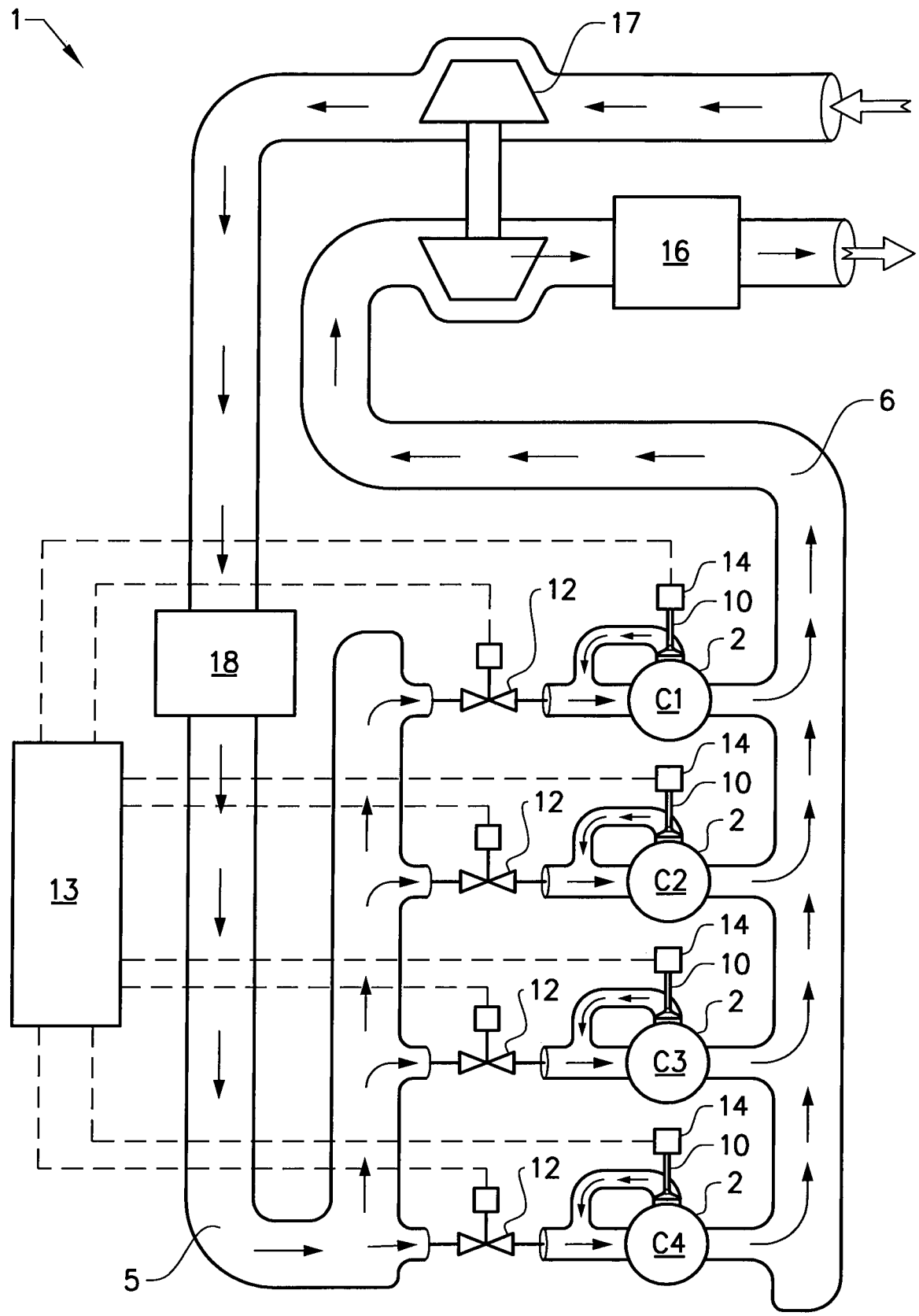
FIG. 2 shows components of a four cylinder engine according to an embodiment of the invention.

FIG. 1 shows a vehicle 500 in the form of a truck comprising a two-stroke opposed piston (2SOP) diesel engine 1 according to an embodiment of the invention. As can be seen in FIG. 2, the engine comprises four cylinders 2, air intake arrangement 5 with a single intake manifold, an exhaust guiding arrangement 6 with a single exhaust manifold. An exhaust after treatment system (EATS) 16 is provided in the exhaust guiding arrangement 6. Further a turbo charger 17 is provided upstream of the EATS 16, to pressurise air in the intake arrangement 5 using energy of the exhaust gases in the exhaust guiding arrangement 6. Alternatively, the turbo charger may be powered by an electric motor. The intake arrangement is provided with an intercooler 18. A supercharger could also be provided as is known in the art.

Figure 3:
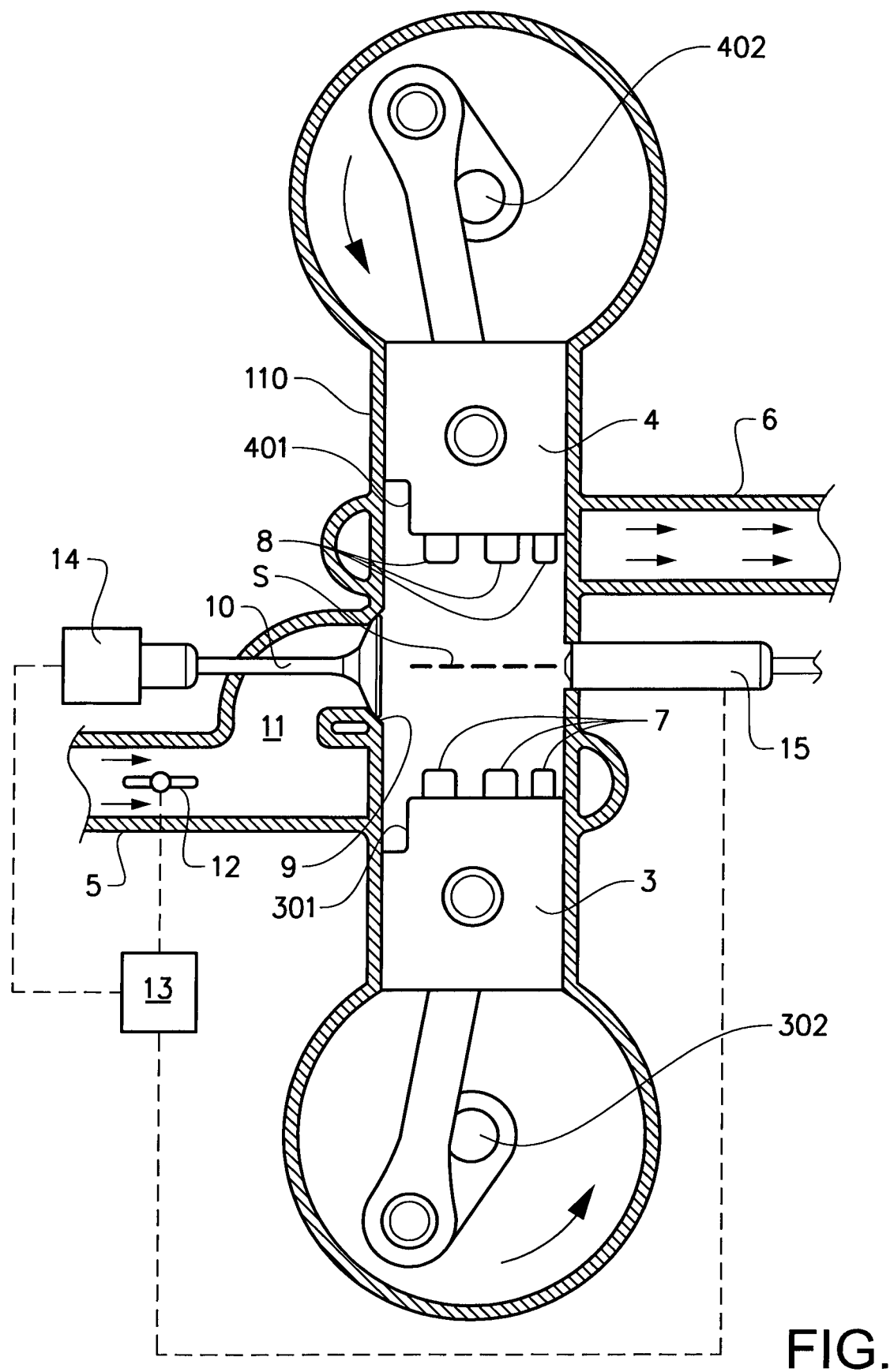
FIG. 3 shows a longitudinally cross-sectional view of one of the cylinders of the engine in FIG. 2.

As suggested in FIG. 3, the cylinders are presented in an engine block 110. Each cylinder is provided with a first piston 3 and a second piston 4 adapted to perform opposed motions in the cylinder. As can be seen in FIG. 3, the engine presents two crankshafts 302, 402, and the first and second pistons 3, 4 are connected to a respective of the crankshafts 302, 402.

As can be seen in FIG. 3, each cylinder 2 is, at one of its ends, herein referred to as the intake end, provided with a plurality of intake ports 7. The intake ports 7 are distributed circumferentially around the cylinder interior wall. The intake ports 7 are located such that a communication between the air intake arrangement 5 and the cylinder 2 via the intake ports 7 is dependent on the position of the first piston 3. Each cylinder 2 is, at its opposite end, herein referred to as the exhaust end, provided with a plurality of exhaust ports 8. The exhaust ports 8 are distributed circumferentially around the cylinder interior wall. The exhaust ports 8 are located such that a communication between the exhaust guiding arrangement 6 and the cylinder 2 via the exhaust ports 7 is dependent on the position of the second piston 4.

The first and second pistons 3, 4 are as stated adapted to perform opposed motions in the cylinder 2, but as is known in 2SOP engines, the piston at exhaust end can be slightly advanced in its oscillating movement compared to the piston at the intake end. For this presentation, the pistons 3, 4 are regarded as adapted to perform opposed motions in the cylinder 2, regardless whether the phase of movement of one of the pistons is slightly offset in relation to the phase of the movement of the other piston.

As can be seen in FIG. 3, a fuel system 15 is provided for controlling the supply of fuel to the cylinders 2. The fuel system 15 comprises a fuel injector at each cylinder, adapted to inject fuel between the top dead centres of the pistons.

As can be seen in FIG. 3, each cylinder 2 is provided with an additional port 9 and an additional port valve 10. A communication between the cylinder 2 and an additional conduit 11 externally of the cylinder, via the additional port 9, is controllable with the additional port valve 10. The additional conduit 11 is in communication with the air intake arrangement 5.

A controller 13 for the engine is provided. The controller 13 comprises a computer program comprising program code means for performing steps of methods described below. The controller 13 is adapted to control a valve actuator 14, (FIG. 3), for the additional port valves 10. The valve actuator 14 operates pneumatically, e.g. as described in EP 1299622 incorporated herein by reference. Alternatively, the valve actuator 14 can be an electromechanical actuator or a hydraulic actuator, it can include a stepper motor, or it can include a cam shaft with cam switching, cam phasing, or an oscillating cam.

As can be seen in FIG. 3, the intake ports 7 and the exhaust ports 8 are spaced apart in the longitudinal direction of the cylinder 2, and the additional port 9 is located between the intake ports 7 and the exhaust ports 8. Thus, as can be seen in FIG. 4, in an open position of the additional port valve 10, it allows communication between the cylinder 2 and the additional conduit 11 via the additional port 9, when communication between the cylinder 2 and the air intake arrangement 5 via the intake ports 7 is blocked by the first piston 3, and communication between the cylinder 2 and the exhaust guiding arrangement 6 via the exhaust ports 8 is blocked by the second piston 4.

Figure 4:
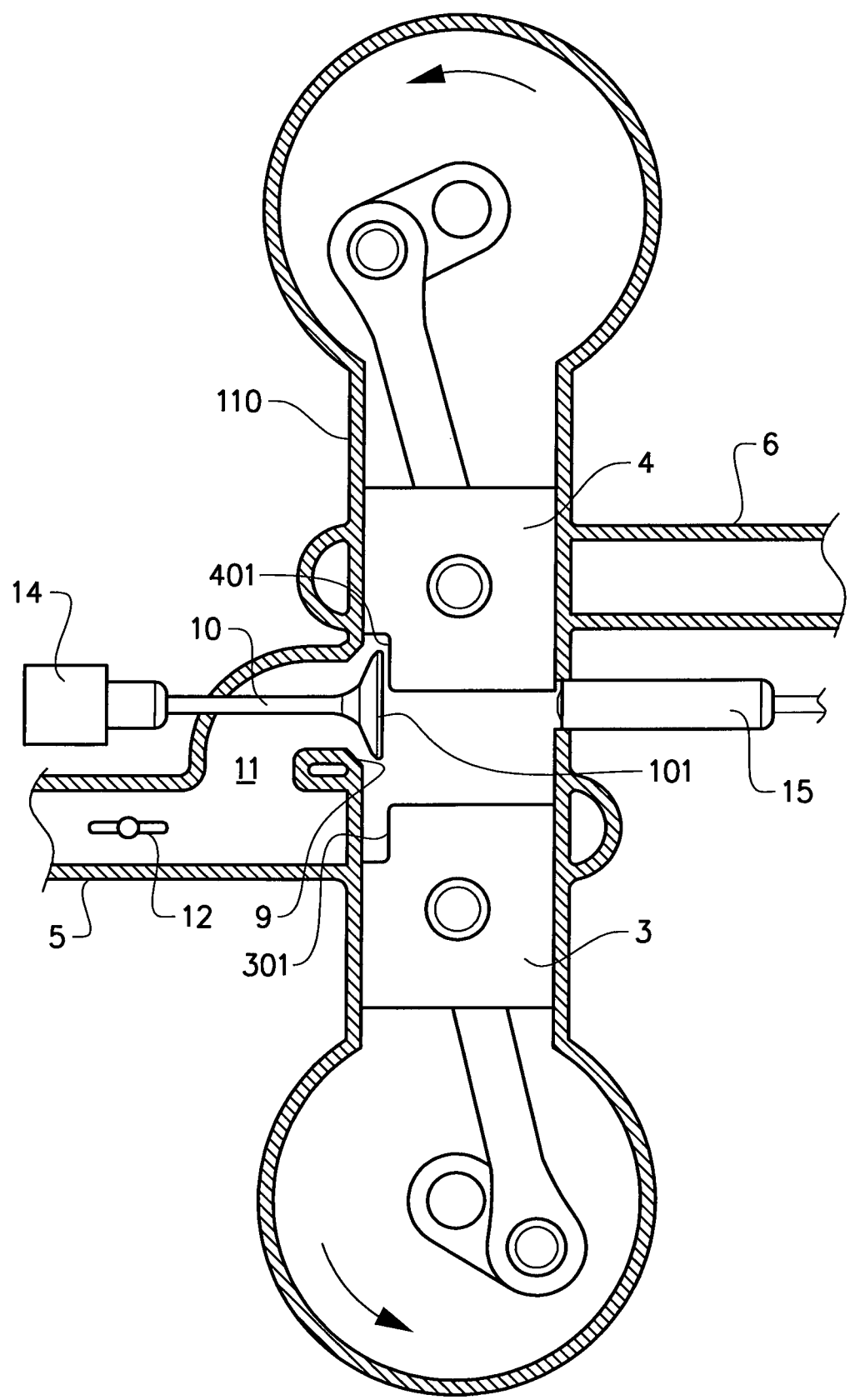
FIG. 4 shows the cylinder in FIG. 3 during a compression stroke.

The additional port valve 10 is a poppet valve, and as can be seen in FIG. 4, it is arranged so that a part 101 of it extends, in the open position of the additional port valve 10, into the cylinder 2. The first and second pistons 3, 4 present respective recesses 301, 401 to accommodate said part 101 of the additional port valve 10.

Figure 5:
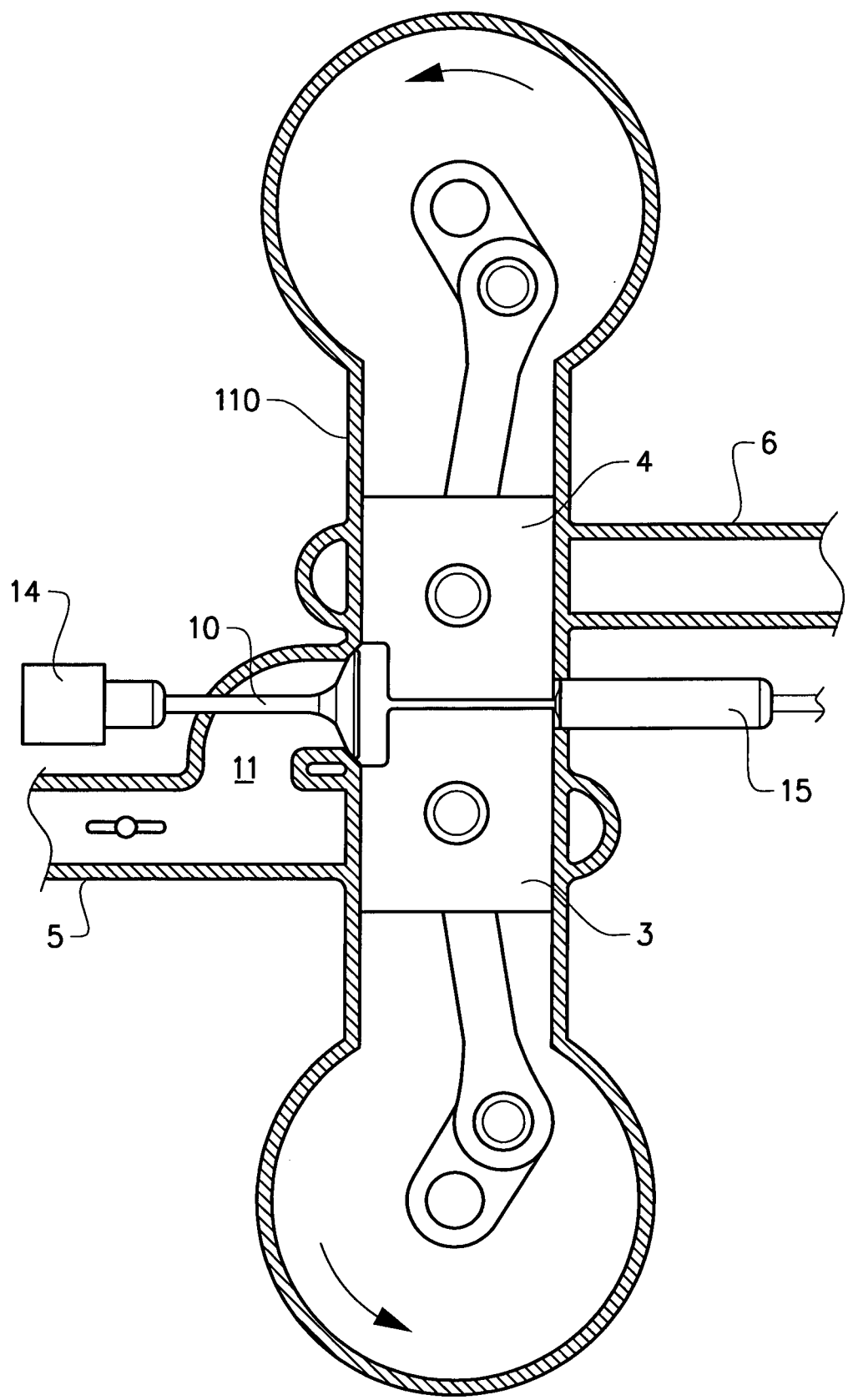
FIG. 5 shows the cylinder in FIG. 3 when pistons therein are at top dead centres.

As can be seen in FIG. 5, the top dead centres of the first and second pistons 3, 4 are symmetrically distributed with respect to the additional port 9. As suggested also in FIG. 3 and FIG. 4, the part 101 of the additional port valve 10, which extends, in the open position of the additional port valve 10, into the cylinder 2, is symmetric with respect to a symmetry plane S, (FIG. 3). The normal of the symmetry plane S is parallel to the longitudinal direction of the cylinder 2, and the piston top dead centres are symmetrically located with respect to the symmetry plane S.

Below three methods of controlling the engine described above are presented with reference to FIG. 6, FIG. 7 and FIG. 8.

Figure 6:
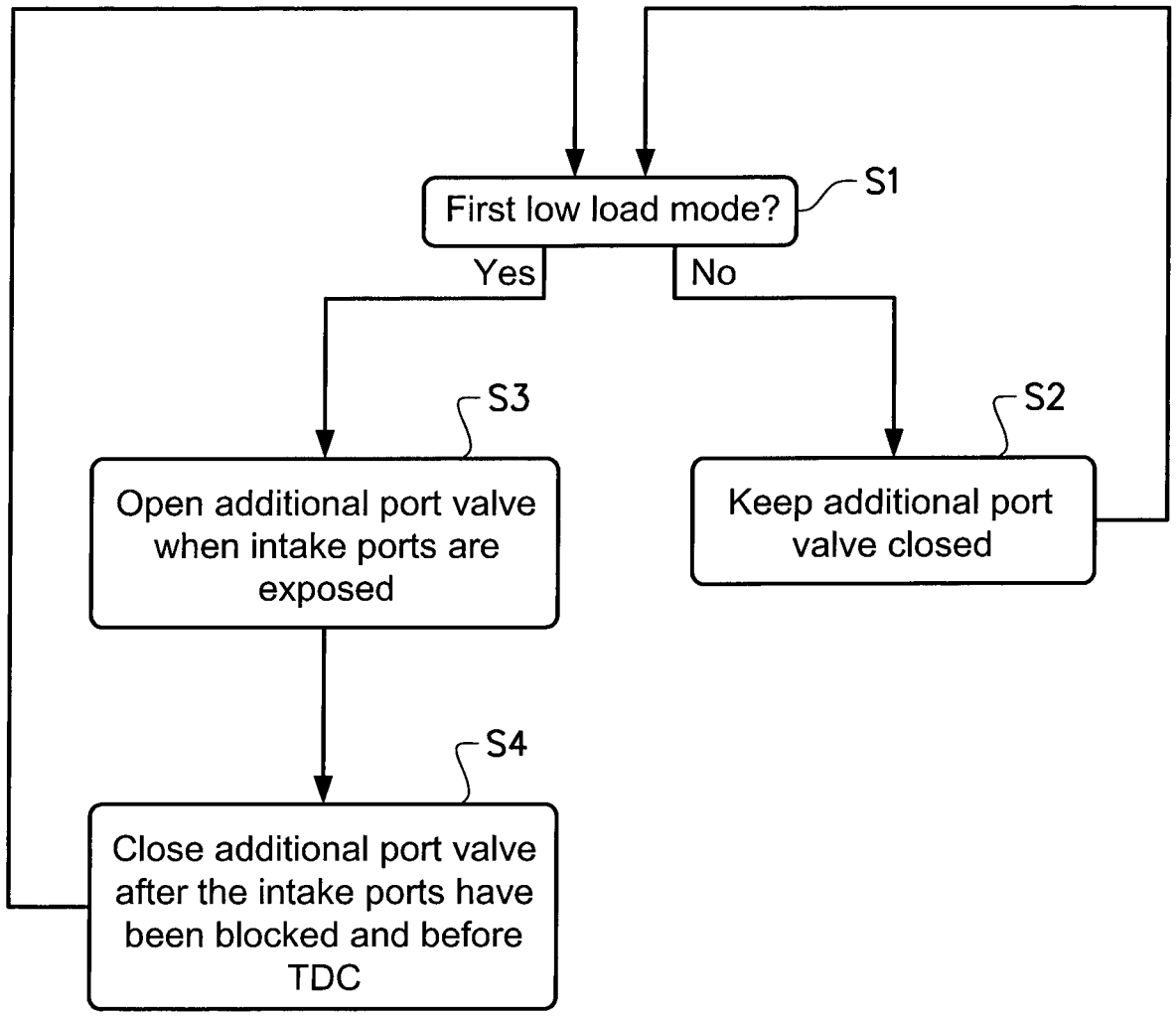
FIG. 6 depicts steps in a first method for controlling the engine in FIG. 2.

Reference is made to FIG. 6. The controller 13 is adapted to control steps of a first method as follows: The controller determines whether the engine is in a low load operational mode, SI. This mode can be defined for example by one or more thresholds of one or more operational parameters, such as an engine torque request from a throttle pedal operated by a driver of the vehicle. If it is determined that the engine is not in the first low load mode, the additional port valves in the cylinders are kept closed during the entire cycles of the cylinders, S2.

If it is determined that the engine is in the first low load mode, the controller controls the additional port valves 10 in the cylinders 2, in the following steps:

At each cycle in the respective cylinder, the additional port valve 10 is opened between consecutive first and second top dead centre (TDC) positions of the first piston 3. More specifically, the additional port valve 10 is opened during a movement of the first piston 3 away from the first top dead centre position, (downwards in FIG. 3), S3. Further, the opening does not start until the first piston has started to expose the intake ports 7 to the cylinder interior. In other words, the opening of the additional port valve 10 takes place after a transition from a condition where a communication between the air intake arrangement 5 and the cylinder 2 via the intake ports 7 is blocked by the first piston 3, to a condition with a communication between the air intake arrangement 5 and the cylinder 2 via the intake port 7.

Subsequently, the additional port valve 10 is closed during a movement of the first piston 3 towards the second top dead centre position, (upwards in FIG. 3), before the first piston 3 has reached the second top dead centre position, after the first piston 3 has again blocked the exposure of the intake ports 7 to the cylinder interior, S4. In other words, the additional port valve 10 is closed after a transition from a condition with a communication between the air intake arrangement 5 and the cylinder 2 via the intake ports 7, to a condition where the communication between the air intake arrangement 5 and the cylinder 2 via the intake ports 7 is blocked by the first piston 3.

Keeping the additional port valve 10 open after the intake ports 7 have been blocked will result in a portion of the air introduced to the cylinder, being expelled through the additional port 9. Thereby less air will be provided for the subsequent combustion with the relative low amount of fuel injected in the first low load mode, and this will contribute to a high exhaust gas temperature, keeping the processes in the EATS efficient in the first low load mode.

In this example, the additional port valve opening and closing steps S3, S3 are performed in all cylinders. Between each cycle in each cylinder, the determination whether the engine is in the first low load mode, SI, is repeated. Alternatively, the determination whether the engine is in the first low load mode can be performed at predetermined time intervals.

As shown in FIG. 2, the air intake arrangement 5 comprises for each cylinder an intake valve 12 for selectively reducing or inhibiting air admittance to the cylinders 2.

Figure 7:
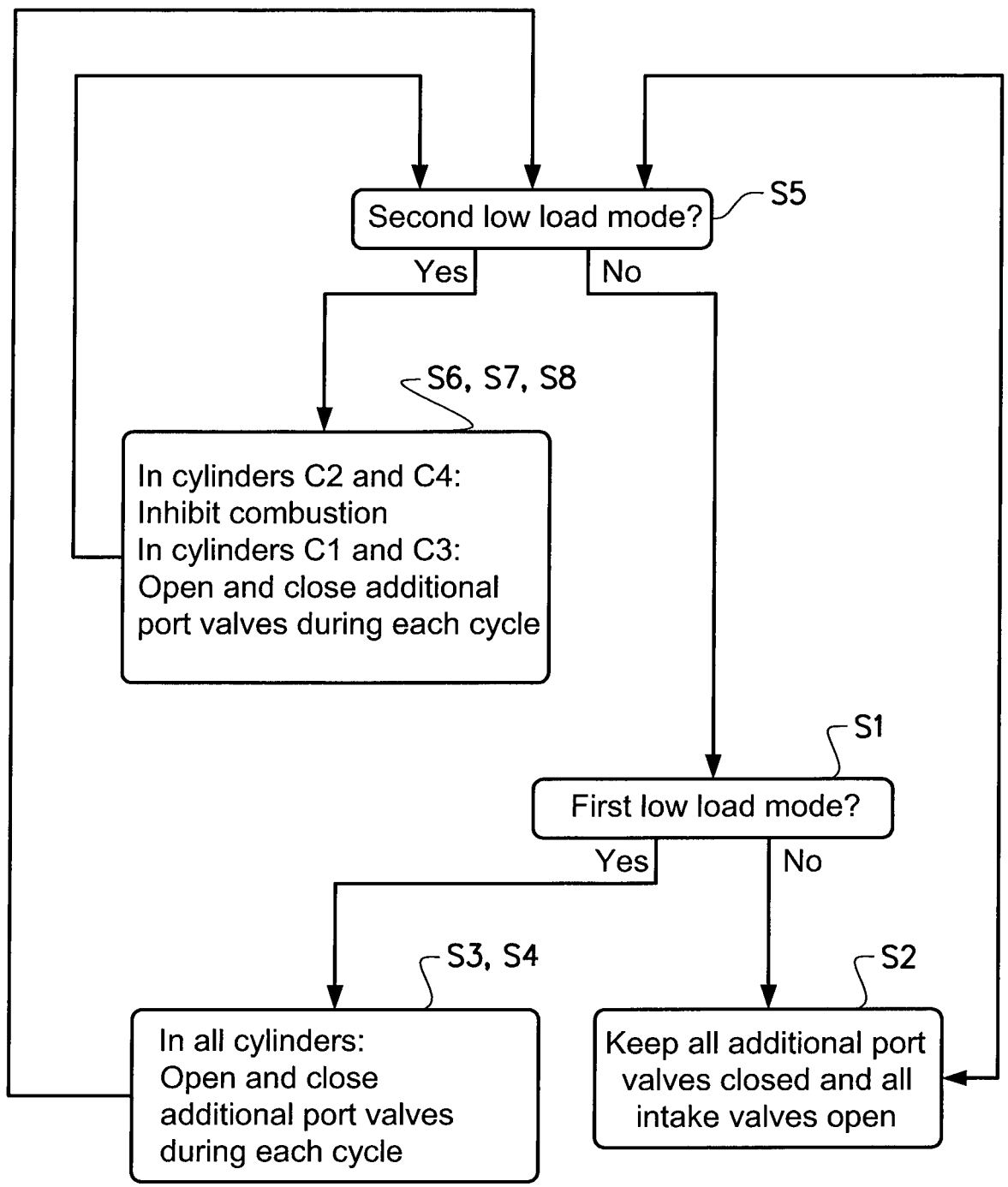
FIG. 7 depicts steps in a second method for controlling the engine in FIG. 2.

Reference is made also to FIG. 3 and FIG. 7. The controller is adapted to control the additional port valves 10, the intake valves 12, and the fuel system 15, so as to control a second method as follows:

The controller determines whether the engine is in a second low load mode, S5. If it is determined that the engine is not in the second low load mode, controller determines whether the engine is in a first low load mode, SI. The engine load at the second low load mode is lower than the load at the first low load mode. For example, the first low load mode can include a first interval of engine torque requests and the second low load mode can include a second interval of engine torque requests, where the highest value of the second torque request interval is lower than the lowest value of the first torque request interval.

If it is determined that the engine is not in the first low load mode, all additional port valves 10 in the cylinders are kept closed during the entire cycles of the cylinders, and all intake valves 12 are kept open, S2.

If it is determined that the engine is in the first low load mode, the additional port valve 10 in all cylinders are opened and closed as described above with reference to FIG. 6, S3, S4. This will keep the exhaust temperature sufficiently high for efficient EATS processes during the first low load mode.

If it is determined in step S5 that the engine is in the second low load mode, the intake valves 12 are controlled so that air supply to two of the cylinders, herein referred to as cylinders C2 and C4, is terminated, S6. More specifically, referring to FIG. 2, the intake valves 12 in respective air intake arrangement branches for air supply to cylinders C2 and C4 are closed. In addition, the fuel system 15 is controlled so that the fuel supply to cylinders C2 and C4 is terminated. Further, the additional port valves in cylinders C2 and C4 are kept closed. Further, if it is determined that the engine is in the second low load mode, the additional port valves 10 in the remaining cylinders, herein referred to as cylinders C1 and C3, are opened and closed, S7, S8, in the same manner as has been described above with reference to FIG. 6, (steps S3, S4).

Thereby cylinders C2 and C4 are deactivated, while cylinders CI and C3 are controlled with a reduced air supply by means of the additional port valves 10. The combination of cylinder deactivation and air reduction in active cylinders substantially reduces the air transport to the exhaust guiding arrangement 6 during the second low load mode. Thereby, a particularly effective manner of maintaining a high exhaust temperature is provided. This will keep the exhaust temperature sufficiently high for efficient EATS processes also during the second low load mode.

It should be noted that the choice of cylinders C2 and C4 for deactivation is an example. In some embodiments, the cylinder deactivation can be rotated, such that at some time intervals, a certain subgroup of the cylinders is deactivated, while at other time intervals another subgroup of the cylinders is deactivated. In the respective time intervals, the additional port valves 10 in the remaining cylinders can be opened and closed during the cylinder cycles.

At predetermined time intervals the determinations whether the engine is in the second low load mode, and where applicable whether the engine is in the first low load mode, are repeated.

The method described with reference to FIG. 7 involves stepwise exhaust temperature increasing measures. In this example, at a relatively low engine load, such measures are limited to the additional port valve operation, while at an even lower engine load, the cylinder deactivation is added as a further measure. In alternative embodiments, different stepwise strategies could be adopted. For example cylinder deactivation could be a measure at the higher of the low load intervals, while the mix of cylinder deactivation and additional port valve operation could be activated at the lower of the low load intervals.

Figure 8:
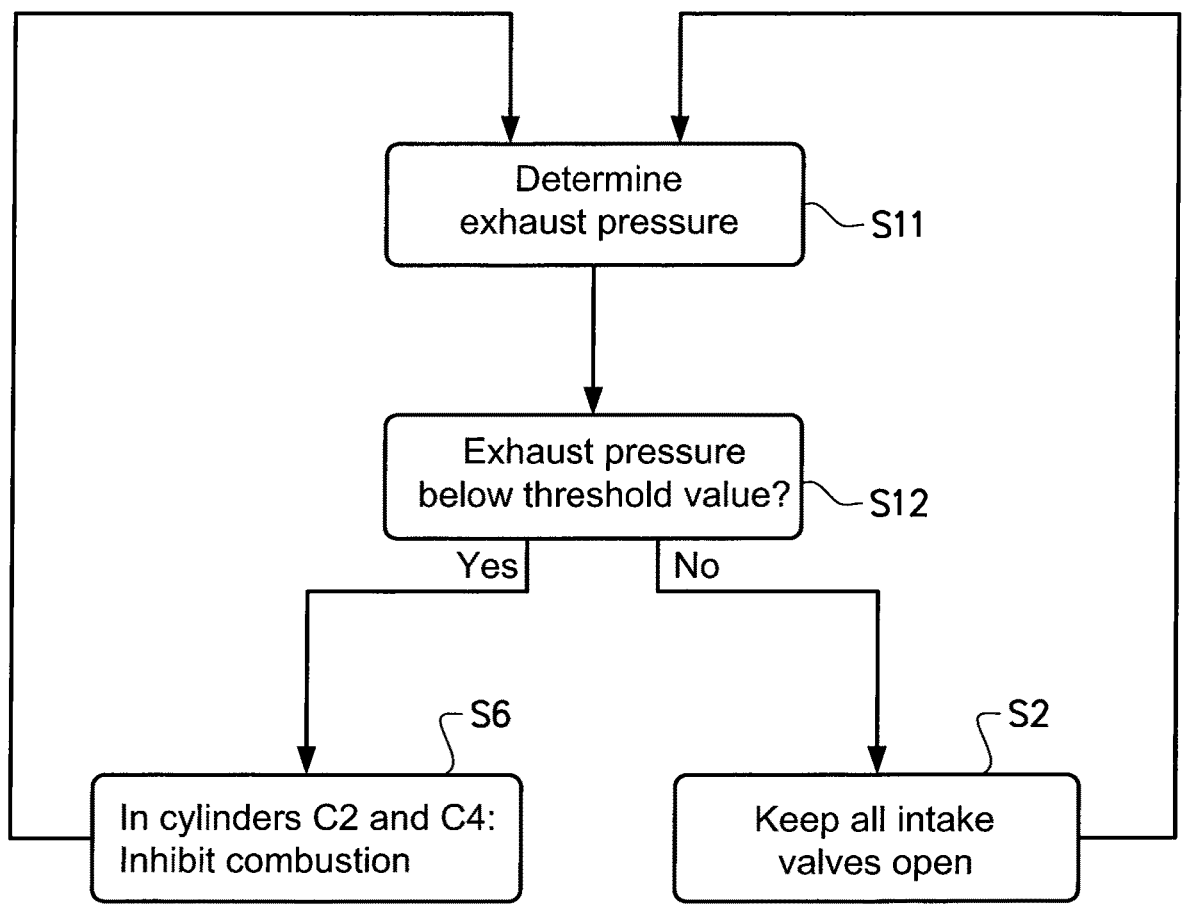
FIG. 8 depicts steps in a third method for controlling the engine in FIG. 2.
Figure 9:
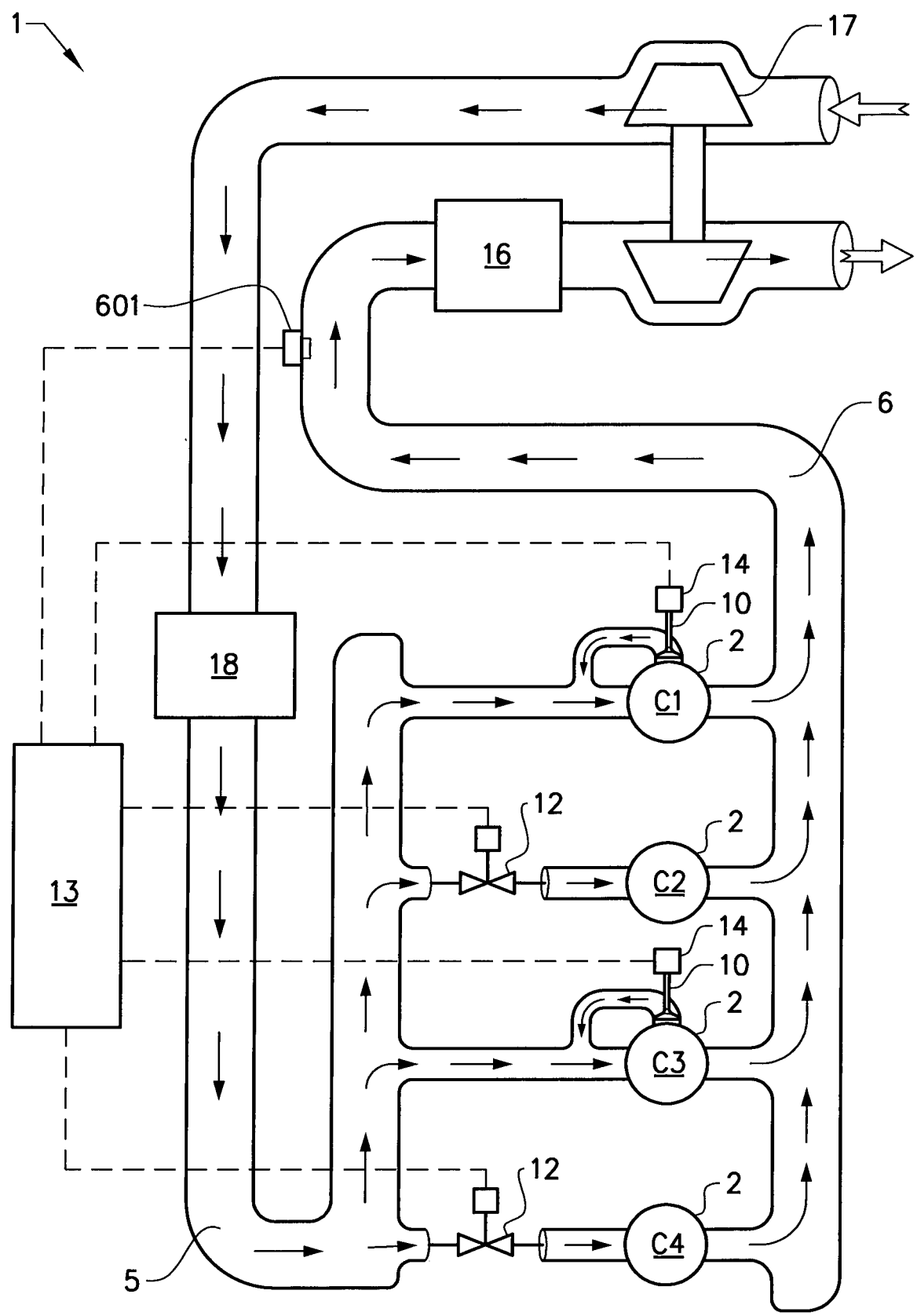
FIG. 9 shows components of an engine according to an alternative embodiment of the invention.

Reference is made also to FIG. 8 and FIG. 9. In the embodiment in FIG. 9, the EATS 16 is located upstream of the turbo charger 17. A pressure sensor 601 is adapted to detect the pressure in the exhaust guiding arrangement 6, upstream of the EATS 16. It should be noted that the pressure sensor 106 can alternatively be located downstream of the EATS 16 but nevertheless upstream of the turbo charger 17. The pressure sensor is connected to the controller 13, and can thereby produce data corresponding to pressure feedback to the controller 13. The controller is adapted to control the intake valves 12 and the fuel system 15, so as to control a third method as follows:

In the method described with reference to FIG. 8, the controller 13 determines based on feedback from the pressure sensor 601 the pressure in the exhaust guiding arrangement 6, SI 1. The controller 13 compares the determined pressure value to a predetermined pressure threshold value, SI 2. If the pressure is above the threshold value, all intake valves 12 are kept open, S2. If the pressure is below the threshold value, the intake valves 12 are controlled so that air supply to cylinders C2 and C4 is terminated, S6. More specifically, referring to FIG. 9, the intake valves 12 adapted to control the air supply to cylinders C2 and C4 are closed, and the fuel system 15 is controlled so that the fuel supply to cylinders C2 and C4 is terminated. Thereby cylinders C2 and C4 are deactivated, while cylinders CI and C3 remain active. The additional port valves 10 in cylinders CI and C3 are kept closed.

Thus, upon detecting a low pressure in the exhaust guiding arrangement 6, deactivating cylinders C2 and C4 will increase the pressure in the exhaust guiding arrangement, and this will ensure that catalytic reactions in the EATS are maintained. Also, preventing a pressure drop in the exhaust guiding arrangement 6 by cylinder deactivation, will prevent the turbo charger 17 from stopping to operate. By keeping the turbo charger operating, there will be a further contribution to keeping the pressure in the exhaust guiding arrangement relatively high, which again is beneficial to the processes in the EATS.

As an alternative in the method described with reference to FIG. 8, instead of measuring the exhaust guiding arrangement pressure directly, an engine operation parameter which is correlated to the exhaust guiding arrangement pressure can be used. In such an embodiment, the method comprises providing correlation data which correlates the values of the correlated engine operation parameter to the respective values of the exhaust pressure. The correlation data is before operation of the engine stored in a data storage unit accessible to the controller 13. Thus, in step SI 1 in FIG. 8, instead of determining the exhaust pressure, the controller 13 determines the correlated engine operation parameter, and in step SI 2, the determined correlated engine operation parameter is compared to a correlated engine operation parameter threshold value. The steps S2 or S6 are selected based on the comparison. The correlated engine operation parameter could be for example the engine load, values of which are correlated to respective values of the exhaust gas pressure upstream of the EATS.

It should be noted that the method described with reference to FIG. 8 can also be carried out in an engine where a part of the EATS 16 is located downstream of the turbo charger 17.

In the embodiment in FIG. 9, only cylinders C1 and C3 are provided with additional ports and additional port valves 10. Further, intake valves 12 are provided for only cylinders C2 and C4. In this engine, the method described above with reference to FIG. 6 can be performed in the cylinders with the additional port valves 10. Also, the method described with reference to FIG. 7 can be performed in the engine in FIG. 9. The engine in FIG. 9 entails a reduced complexity and cost, since the additional port valves with actuators, and the intake valves are provided in half the number compared to the engine in FIG. 2.

It should also be noted that the method described with reference to FIG. 8 can be carried out with an engine where all cylinders are provided with additional ports, additional port valves 10, and intake valves 12, as in the engine in FIG. 2.

Figure 10:
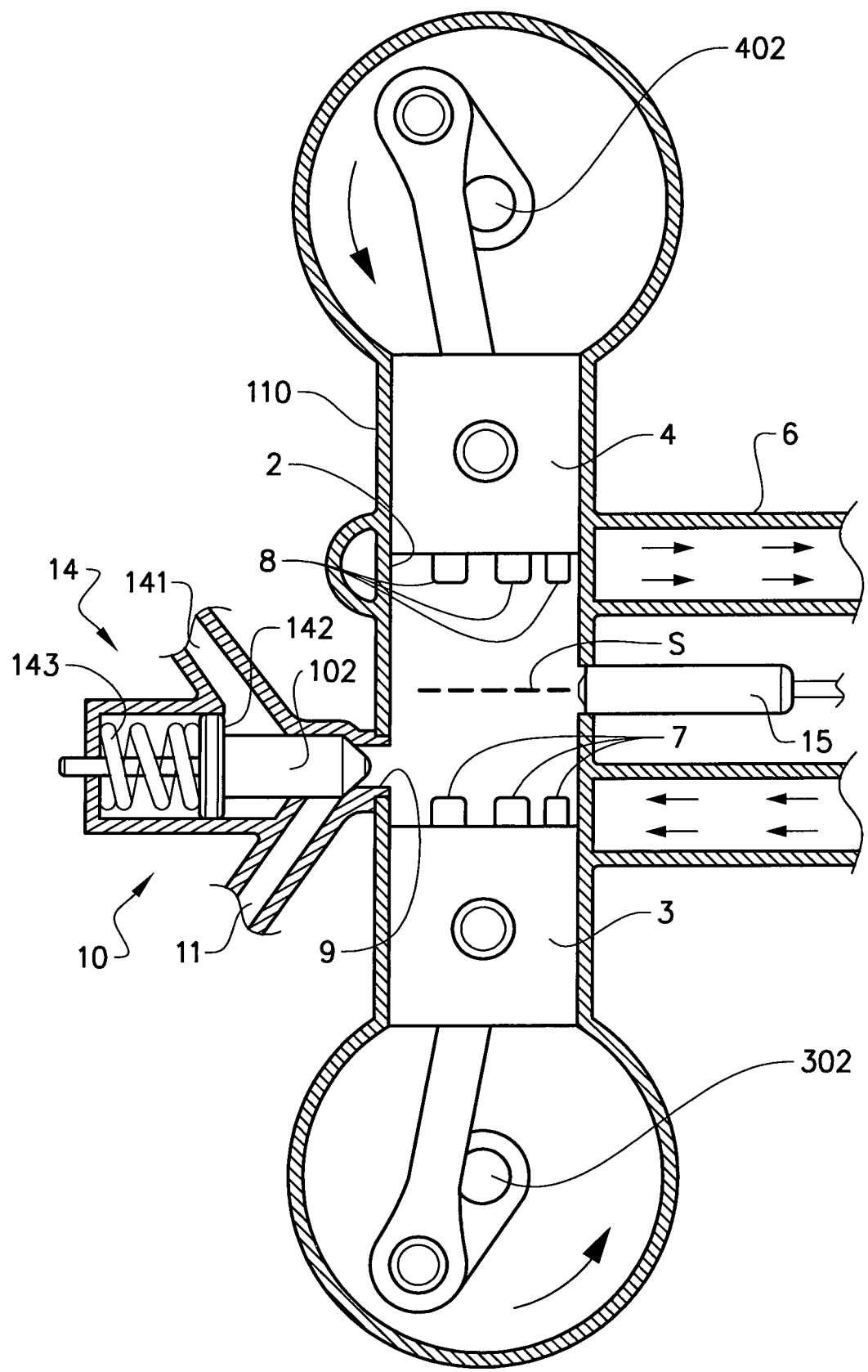
FIG. 10 shows a longitudinally cross-sectional view of a cylinder of an engine according to a further embodiment of the invention.

Reference is made to FIG. 10. The diesel engine depicted in FIG. 20 differs from the engine described above with reference to FIG. 2-4 in that the additional port 9 is offset from a symmetry plane S of the cylinder. The symmetry plane S is located and oriented such that the normal of the symmetry plane S is parallel to the longitudinal direction of the cylinder 2, and the top dead centres of the first and second pistons 3, 4 are symmetrically located with respect to the symmetry plane S. Thus, the additional port 9 is offset from the symmetry plane S in the longitudinal direction of the cylinder.

The communication between the cylinder 2 and an additional conduit 11 is controllable with an additional port valve 10. The additional port valve 10 comprises a spring loaded valve piston 102. A valve actuator 14 is hydraulic and comprises a hydraulic fluid conduit 141 adapted to provide, by means of a hydraulic pump and a hydraulic valve (not shown), a hydraulic pressure against a flange 141 on the valve piston. The pressure on the flange 142 can bias the piston against a valve spring 143 in a direction away from the cylinder 2, so as to open the communication between the cylinder 2 and the additional conduit 11.

The additional port 9 is located on the same side of the symmetry plane S as the intake ports 7. The additional port 9 slightly overlaps the intake ports 7 in the longitudinal direction of the cylinder 2, but extends, again in the longitudinal direction of the cylinder 2, closer to the symmetry plane S than the intake ports 7. A distance is provided between the additional port 9 and the symmetry plane S.

Thereby, the communication between the cylinder 2 and the additional conduit 11 via the additional port 7 is, similarly to the intake ports 7, dependent on the position of the first piston 3.

Thus, for activation of the exhaust temperature increasing operation, described above, in this embodiment, the additional port valve can be opened and remain open throughout the cycles in the cylinder. The additional port 9 will be exposed to the cylinder interior during the movement of the first piston 3 away from the top dead centre, before the ports 7 have been exposed.

Further, additional port 9 will be blocked from the cylinder interior during the movement of the first piston 3 towards the top dead centre, after the ports 7 have been blocked. Thereby, during a compressions stroke during an engine low load mode, air can be expelled through the additional port 9, so that the total amount of air captured in the cylinder is reduced in order to increase the exhaust temperature. After the additional port 9 has been blocked by the first piston 3, during the compression stroke, the remaining air is compressed during the remaining travel of the first piston towards the top dead centre.

It should be noted that in an aspect of the invention, the engine is arranged so that the additional port valve 10 has exclusive control over the communication between the cylinder 2 and the air intake arrangement 5 via the additional port 9. Such an engine could be provided without the intake valves 12, (FIG. 2), for selectively blocking communication between the cylinders 2 and the air intake arrangement 5.

The invention claimed is:

1. A two-stroke opposed piston diesel internal combustion engine comprising:
    a plurality of cylinders, wherein each cylinder of the plurality of cylinders includes a first piston and a second piston, the first piston and the second piston configured to perform opposed motions within the cylinder;
    an air intake arrangement, wherein a communication between the air intake arrangement and each cylinder via a respective intake port is dependent on a position of the first piston; and
    an exhaust guiding arrangement, wherein a communication between the exhaust guiding arrangement and each cylinder via a respective exhaust port is dependent on a position of the second piston,
    wherein the plurality of cylinders comprises a first subgroup of cylinders and a second subgroup of cylinders, such that each cylinder of the first subgroup of cylinders is provided with a cylinder port valve, the cylinder port valve configured to control an amount of air expelled from the cylinder to a location directly upstream of the respective cylinder of the first subgroup of cylinders via a cylinder port conduit, and such that each cylinder of the second subgroup of cylinders is provided with an air intake valve, the air intake valve configured to control an amount of air admitted to the respective cylinder of the second subgroup of cylinders via the air intake arrangement.

2. The engine according to claim 1, wherein the cylinder port conduit is located such that, in an open position of the cylinder port valve, the cylinder port valve allows communication between the respective cylinder of the first subgroup of cylinders and the location directly upstream of the respective cylinder of the first subgroup of cylinders via the cylinder port conduit when communication between the respective cylinder of the first subgroup of cylinders and the air intake arrangement via the respective intake port is blocked by the first piston, and communication between the respective cylinder of the first subgroup of cylinders and the exhaust guiding arrangement via the respective exhaust port is blocked by the second piston.

3. The engine according to claim 1, wherein the respective intake port and the respective exhaust port are spaced apart in a longitudinal direction of the cylinder, and the cylinder port valve is located between the respective intake port and the respective exhaust port.

4. The engine according to claim 1, wherein the cylinder port conduit is an extension of, or is arranged to communicate with, the air intake arrangement.

5. The engine according to claim 1, wherein the cylinder port valve is a poppet valve.

6. The engine according to claim 1, wherein the cylinder port valve is arranged such that a part of the cylinder port valve extends, in an open position of the cylinder port valve, into the cylinder, and the first and second pistons each comprise a respective recess to accommodate the part of the cylinder port valve.

7. The engine according to claim 1, wherein the cylinder port conduit is located such that top dead centre positions of the first and second pistons are symmetrically distributed with respect to the cylinder port conduit.

8. The engine according to claim 1, wherein the cylinder port valve is arranged such that a part of the cylinder port valve extends, in an open position of the cylinder port valve, into the cylinder, and top dead centre positions of the first and second pistons are symmetrically located with respect to the cylinder port conduit of the cylinder port valve.

9. The engine according to claim 1, wherein the cylinder port conduit is offset from a symmetry plane of the respective cylinder of the first subgroup of cylinders, such that a longitudinal direction of the cylinder is perpendicular to the symmetry plane, and top dead centre positions of the first and second pistons are symmetrically located with respect to the symmetry plane of the respective cylinder of the first subgroup of cylinders.

10. The engine according to claim 9, wherein the cylinder port conduit is external to the respective cylinder of the first subgroup of cylinders, such that communication between the respective cylinder of the first subgroup of cylinders and the cylinder port conduit is dependent on the position of at least one of the first piston and the second piston.

11. The engine according to claim 9, wherein a space is provided between the cylinder port conduit and the symmetry plane of the respective cylinder of the first subgroup of cylinders.

12. The engine according to claim 9, wherein the respective intake port and the respective exhaust port are located on opposite sides of the symmetry plane of the respective cylinder of the first subgroup of cylinders, and the cylinder port conduit is located on a same side of the symmetry plane of the respective cylinder of the first subgroup of cylinders as the respective intake port.

13. The engine according to claim 12, wherein the cylinder port conduit extends, in the longitudinal direction of the cylinder, closer to the symmetry plane of the respective cylinder of the first subgroup of cylinders than the respective intake port.

14. The engine according to claim 9, wherein the respective intake port and the respective exhaust port are located on opposite sides of the symmetry plane of the respective cylinder of the first subgroup of cylinders, and the cylinder port conduit is located on a same side of the symmetry plane of the respective cylinder of the first subgroup of cylinders as the respective exhaust port.

15. The engine according to claim 14, wherein the cylinder port conduit extends, in the longitudinal direction of the cylinder, closer to the symmetry plane of the respective cylinder of the first subgroup of cylinders than the respective exhaust port.

16. A method of controlling a two-stroke opposed piston diesel internal combustion engine, the method comprising:

providing a plurality of cylinders, wherein each cylinder of the plurality of cylinders includes a first piston and a second piston, the first piston and the second piston configured to perform opposed motions within the cylinder, an air intake arrangement, wherein a communication between the air intake arrangement and each cylinder via a respective intake port is dependent on a position of the first piston, and an exhaust guiding arrangement, wherein a communication between the exhaust guiding arrangement and each cylinder via a respective exhaust port is dependent on a position of the second piston, wherein the plurality of cylinders comprises a first subgroup of cylinders and a second subgroup of cylinders, such that each cylinder of the first subgroup of cylinders is provided with a cylinder port valve, the cylinder port valve configured to control an amount of air expelled from the cylinder to a location directly upstream of the respective cylinder of the first subgroup of cylinders via a cylinder port conduit, and such that each cylinder of the second subgroup of cylinders is provided with an air intake valve, the air intake valve configured to control an amount of air admitted to the respective cylinder of the second subgroup of cylinders via the air intake arrangement;

providing a fuel system for controlling a supply of fuel to the plurality of cylinders via at least one fuel injector provided at each cylinder of the plurality of cylinders;

opening, in at least one of the cylinders of the first subgroup of cylinders, the cylinder port valve between consecutive first and second top dead centre positions of the first piston, and subsequently, during a movement of the first piston towards the second top dead centre position, before the first piston has reached the second top dead centre position, closing the cylinder port valve after a transition from a condition where the respective intake port is not blocked by the first piston, to a condition where the respective intake port is blocked by the first piston; and reducing or inhibiting a supply of air via the air intake valve of the respective cylinder of the second subgroup of cylinders and fuel via the at least one fuel injector at each cylinder of the second subgroup of cylinders so as to reduce or inhibit combustion in the second subgroup of cylinders, wherein reducing or inhibiting combustion in the second subgroup of cylinders is performed simultaneously with the steps of opening and closing the cylinder port valve in the at least one cylinder of the first subgroup of cylinders.

17. The method according to claim 16, wherein the step of opening the cylinder port valve is performed during a movement of the first piston away from the first top dead centre position, and after a transition from the condition where the respective intake port is blocked by the first piston, to the condition where the respective intake port is not blocked by the first piston.

18. A computer programmed to perform the steps of the method according to claim 16.

19. A non-transitory computer readable medium for a computer programmed to perform the steps of the method according to claim 16.

20. A controller for a two-stroke opposed piston diesel internal combustion engine, the engine comprising:

a plurality of cylinders, wherein each cylinder of the plurality of cylinders includes a first piston and a second piston, the first piston and the second piston configured to perform opposed motions within the cylinder;

an air intake arrangement, wherein a communication between the air intake arrangement and each cylinder via a respective intake port is dependent on a position of the first piston; and an exhaust guiding arrangement, wherein a communication between the exhaust guiding arrangement and each cylinder via a respective exhaust port is dependent on a position of the second piston, wherein the plurality of cylinders comprises a first subgroup of cylinders and a second subgroup of cylinders, such that each cylinder of the first subgroup of cylinders is provided with a cylinder port valve, the cylinder port valve configured to control an amount of air expelled from the cylinder to a location directly upstream of the respective cylinder of the first subgroup of cylinders via a cylinder port conduit, and such that each cylinder of the second subgroup of cylinders is provided with an air intake valve, the air intake valve configured to control an amount of air admitted to the respective cylinder of the second subgroup of cylinders via the air intake arrangement, and wherein the controller is configured to control a respective valve actuator such that the cylinder port valve will assume an open position or a closed position, the open position allowing communication between the respective cylinder of the first subgroup of cylinders and the cylinder port conduit, and the closed position preventing communication between the respective cylinder of the first subgroup of cylinders and the cylinder port conduit, the controller being further configured to perform the steps of the method according to claim 16.

* * * * *